Patented Aug. 24, 1926.

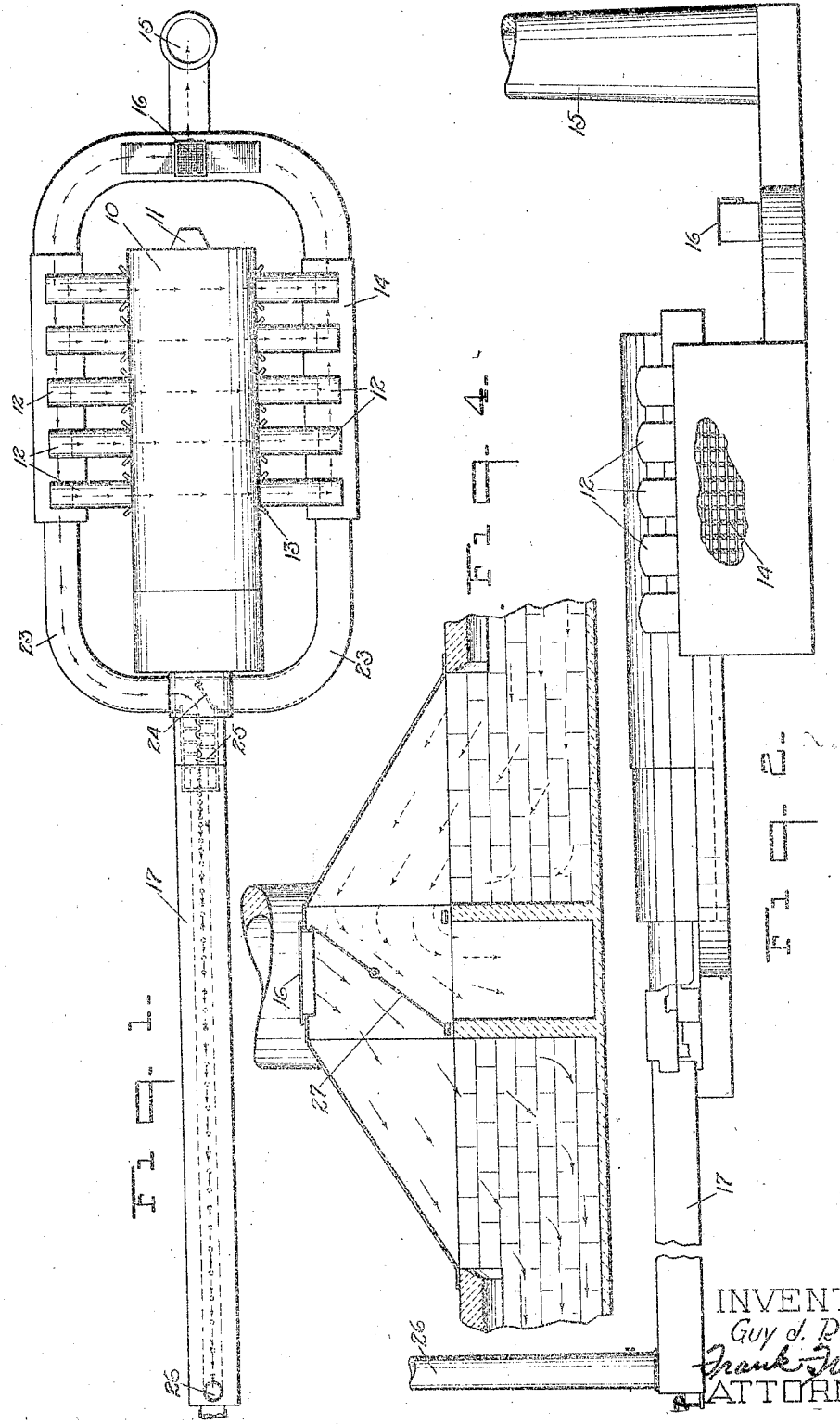

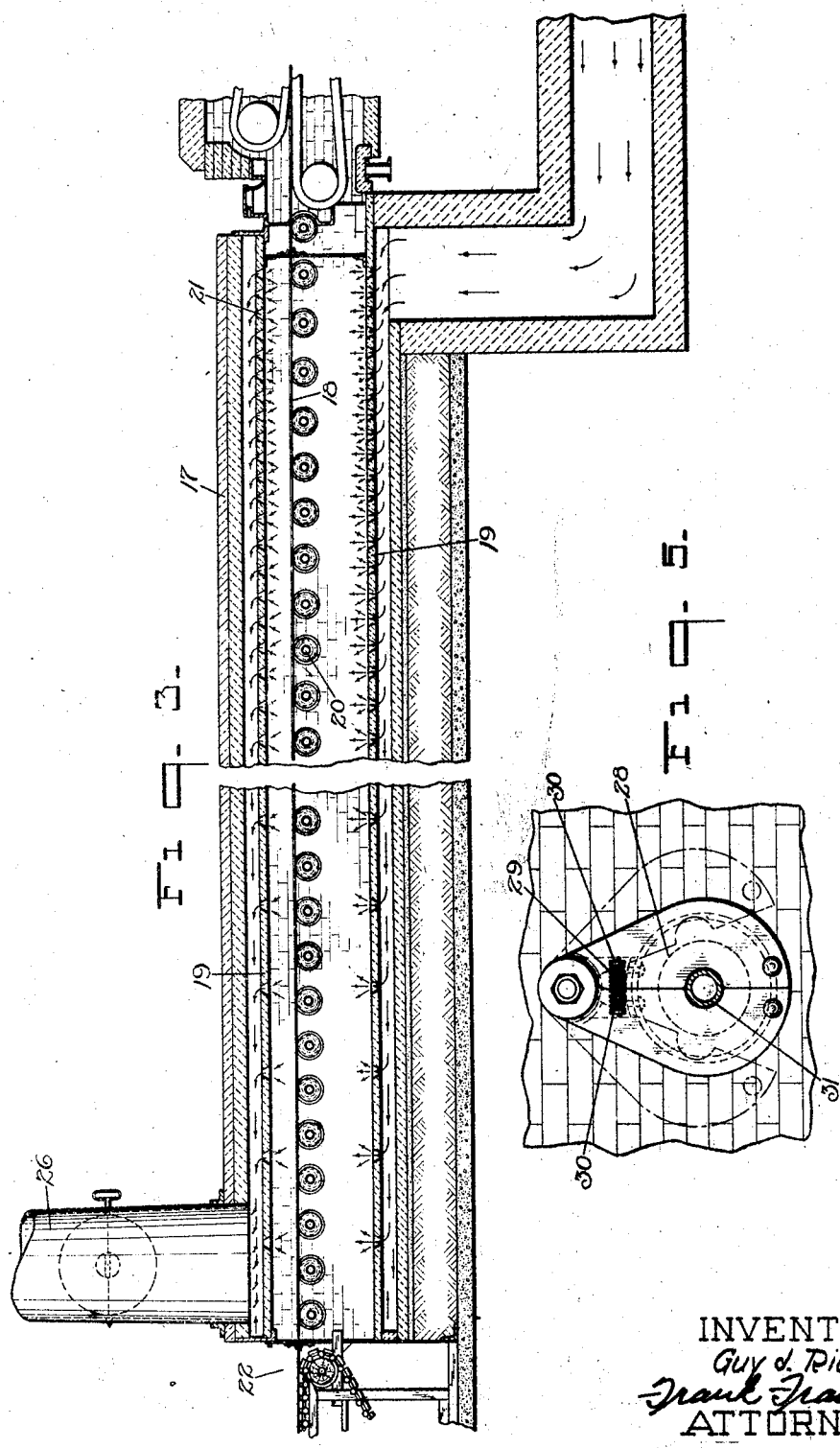

1,597,481

UNITED STATES PATENT OFFICE.

GUY J. RICE, OF CHARLESTON, WEST VIRGINIA, ASSIGNOR TO THE LIBBEY-OWENS SHEET GLASS COMPANY, OF TOLEDO, OHIO, A CORPORATION OF OHIO.

MEANS FOR HEATING AN ANNEALING LEER AND PROCESS OF ANNEALING.

Application filed November 3, 1924. Serial No. 747,583.

The present invention relates to sheet glass drawing apparatus, and has particular reference to an annealing leer and means for heating the annealing leer.

An important object of this invention is to provide an annealing leer for use in connection with sheet glass apparatus wherein the heat used for the annealing process will be accurately controlled and of such a nature as not to spoil the sheet being annealed.

A further object of the invention is to provide an annealing leer for use in connection with sheet glass apparatus wherein heat is absorbed from the exhaust gases of the heating means used for sheet glass apparatus in a manner that air is passed in proximity to the said heat-absorbing means after which the heated air is continuously introduced within the annealing leer for the purposes of annealing the sheet being passed therethrough.

A still further object of the invention is to provide a construction of this nature which may be adapted for use on the so-called regenerative type of furnace, wherein the flame is applied to the glass within the tank, first on one side and then on the other, the exhaust gases from one side being passed through a heat-absorbing means through the opposite side, and upon reversal of the operation cold air is passed in proximity to the said heat-absorbing means in a manner to sufficiently heat it for sheet glass annealing purposes.

Other objects and advantages of the invention will become apparent during the course of the following description.

In the drawings wherein like numerals are employed to designate like parts throughout the same:—

Fig. 1 is a top plan view of a sheet glass drawing apparatus,

Fig. 2 is a side elevation thereof,

Fig. 3 is a fragmentary vertical longitudinal section therethrough.

Fig. 4 is a fragmentary transverse section of one end of the apparatus, and

Fig. 5 is a front view of a detail used in connection with the leer.

In the drawings wherein for the purposes of illustration is shown the preferred embodiment of the invention, the numeral 10 designates a tank furnace in which the raw stock which goes to make up the sheet of glass is introduced and in which it is melted. The ingredients are passed into the furnace through the dog-house 11. The ingredients are then melted and passed to the forward end of the tank through a refining portion, after which they pass through a so-called cooling chamber and into the draw-pot. The sheet proper is drawn from the draw-pot and is, in the type of machine illustrated, passed over a bending roll, over a flattening table, and then through an annealing leer to properly condition the sheet. The type of apparatus just described is fully disclosed in the Colburn Patent 1,248,809, granted December 4, 1917.

Although this particular type of machine is here discussed the invention is not necessarily thus limited, as the leer used on any type of glass apparatus can be heated from heat absorbed from the heating means used. In other words, the same idea can be embodied in any type of glass producing apparatus.

In Fig. 1 is clearly shown one form of heating means for the furnace 10, and as can be seen is of the regenerative type. There are a bank of burners 12 on both sides of the furnace and have at their inner ends the gas nozzles 13. Arranged below the members 12 and preferably below the floor line is a so-called checker-work 14, through which the exhaust gases from the opposite side of the furnace exit and through which the intake air on the burners in use, pass to become heated.

In this type of furnace the bank of burners on one side of the tank are in use while the burners on the opposite side are not. The flames shoot across the tank heating the glass, and exit through the opposite burner as is clearly shown by the arrows in Fig. 1. The exhaust gases then pass through the checker-work 14, the said checker-work absorbing most of the heat from the exhaust gases, after which the exhaust connects with the smoke-stack 15. Upon reversal of the operation the air used by the furnace is introduced through the ventilator 16, passes through the checker-work 14 on the opposite side of the machine and is heated, after which it is passed through the members 12, as will readily be understood.

An object of this invention is to utilize a portion of this absorbed heat for the purpose of heating the annealing leer 17 through which the sheet 18 passes. In order to facilitate the use of this heat the ordinary burners used in annealing leers may be dispensed with, and a plate or plates 19 may be arranged above or below, or on either side of the sheet. The sheet 18 is supported upon suitable leer rolls 20 which are usually supported by rotatable shafts journaled in the side of the leer. The plates 19 may be formed of any suitable structure, and are apertured as at 21. The apertures are more closely bunched at the forward end of the machine, and gradually spaced farther and farther apart so that the heating action will be less at the cutting table end 22 of the leer than at the end nearest the draw-pot.

A conduit 23 is connected to the checker-work compartment 14, and is provided with a flap valve 24, so that either side of the conduit 23 may be cut off as desired. At the entrance of the leer a plurality of baffles 25 are provided to maintain an even temperature of air passing within the leer. As is clearly shown in Fig. 1, the air is introduced through the ventilator 16, passes through the checker-work 14, through the conduit 23, and due to the position of the flap valve the heated air passes through the leer and exhausts through the stack 26. Upon reversal of the regenerators, the air will have sufficient force to change the position of the flap valve 24 to the opposite side so that there will be a continuous passage of heated air through the annealing leer. A butterfly valve is also provided in the opposite end of the machine for controlling the passage of the incoming and outgoing air. The butterfly valve 27 is adapted to regulate which side of the furnace the incoming air through the ventilator 16 will pass.

To prevent an excessive escape of air from within the leer a suitable guard 28 is provided and comprises a pair of hinged sections which are normally held in close relationship by means of spring 29, carried by the ears 30. The sections 28 may be separated and slipped over the shaft 31, supporting the leer rolls 20, and upon release of these sections, the spring 29 will bring them into contact again to prevent the escape of heat from the leer.

In the foregoing it will be seen that the leer is heated by means of utilization of heat absorbed from the exhaust gases of the regenerators. In addition to a saving in fuel, the annealing process will be better taken care of due to the control over the heating action by the plates 19.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:—

1. In sheet glass drawing apparatus, a tank furnace, means for drawing a sheet, an annealing leer, and means for heating the annealing leer comprising means for absorbing heat from the exhaust gases from said furnace, means to pass air in proximity to the heat absorbing means to heat the same, and means to pass the thus treated air through the annealing leer.

2. In sheet glass drawing apparatus, a tank furnace, means for drawing a sheet, an annealing leer, and means for heating the annealing leer comprising means for absorbing heat from the exhaust gases from the tank furnace, means to pass air in proximity to said heat absorbing means to heat the same, means to pass the thus treated air through the annealing leer, and means for controlling the heating action of the said heated air in the leer.

3. In sheet glass drawing apparatus, a tank furnace, means for drawing a sheet of glass, an annealing leer, and means for heating the annealing leer comprising a conduit between a portion of the tank furnace and the said leer for the passage of hot air, means arranged at the inlet to the leer for controlling the intake therein, and means in the leer for controlling the heating action of the air.

4. In sheet glass drawing apparatus, a tank furnace, means for drawing a sheet of glass, an annealing leer therefor, means for continuously introducing heated air within the leer, and means for controlling the action thereof in the glass being annealed.

5. In sheet glass drawing apparatus, a tank furnace, means for drawing a sheet of glass, an annealing leer, means associated with the tank furnace for absorbing heat, means for passing air in proximity thereto to heat the same, means for continuously passing the thus treated air through the leer, and means for controlling the action of the heated air upon the glass being annealed.

6. In sheet glass drawing apparatus, a tank furnace, means for drawing a sheet of glass, an annealing leer, means for continuously introducing heated air within the leer, and an apertured member in the leer for controlling the annealing of the glass.

7. In sheet glass drawing apparatus, a tank furnace, means for drawing a sheet of glass, an annealing leer, means for continuously introducing heated air within the leer, and an apertured member arranged on either side of the glass being annealed to control the annealing thereof.

8. In sheet glass drawing apparatus, a tank furnace, means for drawing a sheet of glass, an annealing leer, means for absorbing heat from the exhaust gases of said furnace, means for passing air in proximity thereto for heating the same, a conduit for introducing the thus heated air within the leer, and an apertured member for controlling the action of the heated air on the glass being annealed.

9. In sheet glass drawing apparatus, a tank furnace, means for drawing a sheet of glass, an annealing leer, and means for utilizing heat from the tank furnace for indirectly heating the glass in the leer for annealing the same.

10. The process of annealing sheet glass, consisting in absorbing heat from the exhaust gases from the heating means used in the sheet glass apparatus, passing air in proximity to the heat absorbing means, and then bringing the thus heated air in contact with sheet glass to anneal the same.

11. The process of annealing sheet glass, consisting in absorbing heat from a portion of the heating means used in the sheet glass apparatus, passing air in proximity to the absorbing means to heat the same, and then passing the thus heated air in proximity to the sheet glass, a greater amount of heated air being played on one end of the sheet than at the other to heat the same.

12. The process of annealing sheet glass, consisting in passing heated air in proximity to the sheet of glass, in progressively decreasing the amount from one end of the sheet toward the other.

13. An annealing lever for use in sheet glass drawing apparatus comprising a tunnel-like structure, means to support a sheet of glass therein, means to supply heated air to the tunnel-like structure, and means to control the action of the air upon the sheet of glass being annealed.

14. An annealing leer for use in sheet glass drawing apparatus comprising a tunnel-like structure, means to support a sheet of glass therein, means for supplying heated air to the tunnel-like structure, and an apertured plate for controlling the annealing of the said sheet of glass.

15. An annealing leer for use in sheet glass drawing apparatus comprising a tunnel-like structure, means to support a sheet of glass therein, means to heat the interior of the tunnel-like structure, and an apertured plate for progressively decreasing the heating of the sheet from one end toward the other.

Signed at Charleston, in the county of Kanawha, and State of West Virginia, this 30th day of October, 1924.

GUY J. RICE.